Sept. 23, 1969  C. R. TURNER  3,468,043
NOZZLE FOR SPRAY PUMP
Filed Nov. 15, 1966
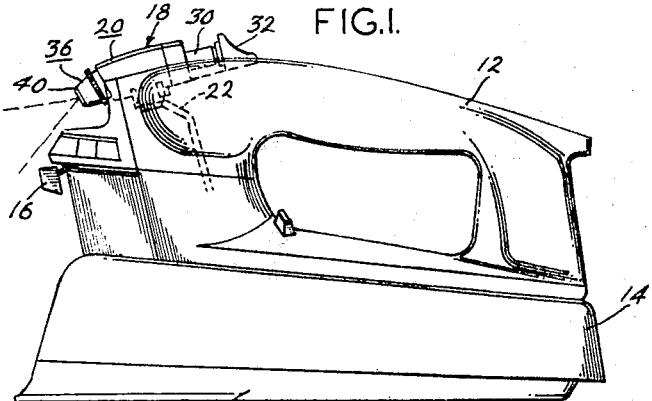
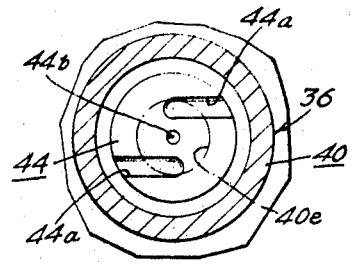
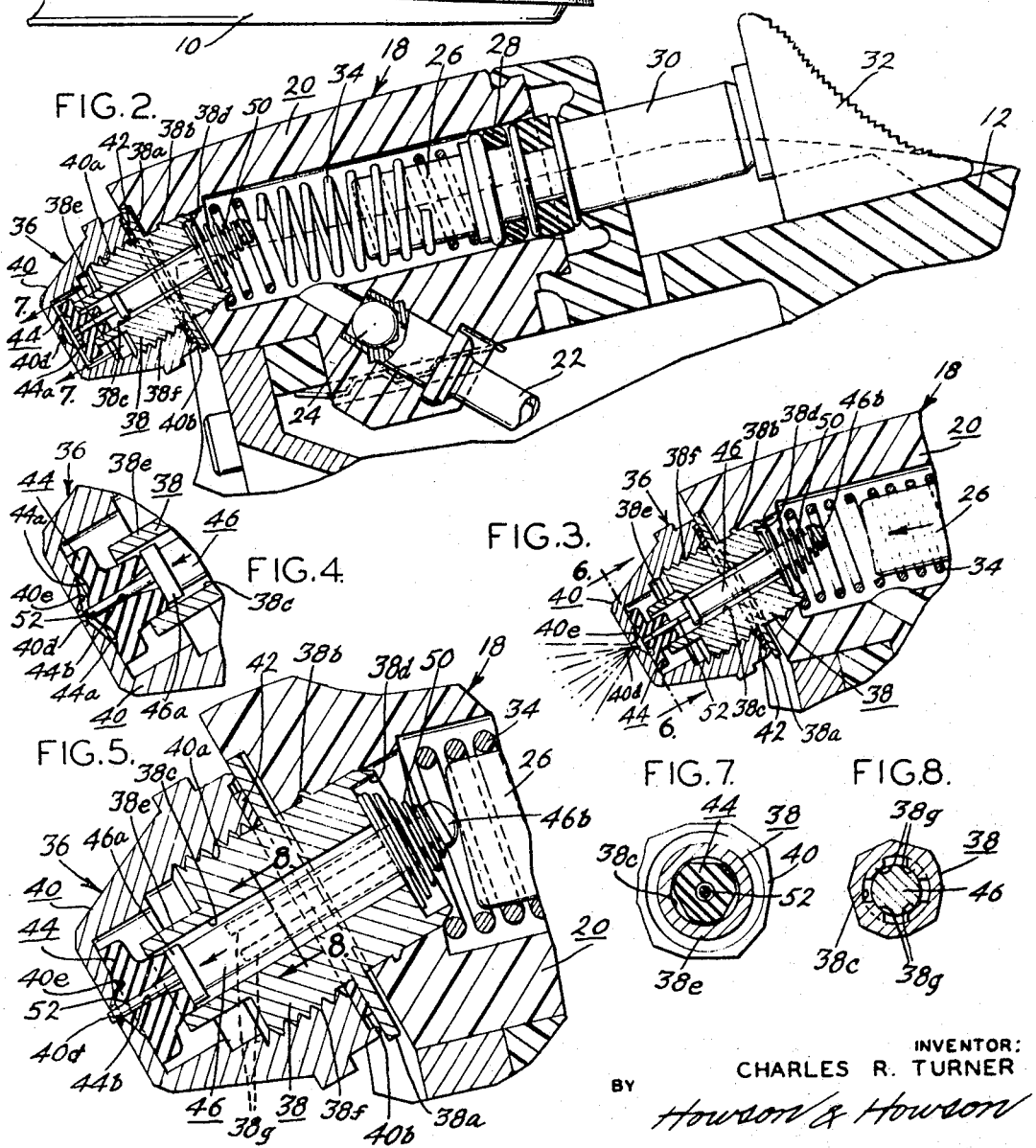
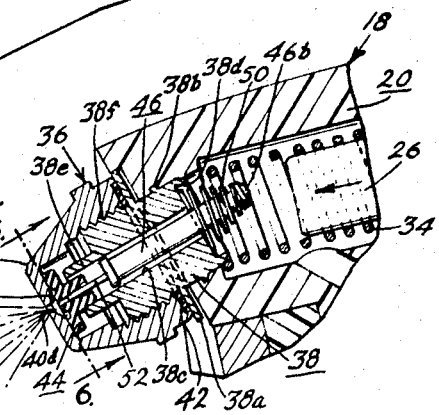
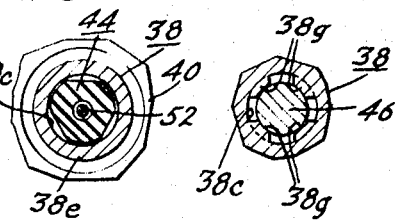
INVENTOR:
CHARLES R. TURNER
BY Howson & Howson
ATTYS.

United States Patent Office 3,468,043
Patented Sept. 23, 1969

3,468,043
NOZZLE FOR SPRAY PUMP
Charles Roger Turner, Philadelphia, Pa., assignor to Proctor-Silex Incorporated, Philadelphia, Pa., a corporation of New York
Filed Nov. 15, 1966, Ser. No. 594,457
Int. Cl. D06f 75/06
U.S. Cl. 38—77.1                                      16 Claims

ABSTRACT OF THE DISCLOSURE

In a nozzle for a spray pump particularly useful for an electric iron water has access to the nozzle orifice through at least one passage in a sealing member of deformable resilient material capable of withstanding fluid pressures without materially deforming but distorting under mechanical pressure selectively applied by piston means within the pump chamber. The same sealing member may be provided with a self seal hole through which a pin on the piston means may pass and, in turn, pass through and clean the nozzle orifice. Furthermore, the same sealing means may be capable of slight movement away from the orifice as air tends to be drawn into the cylinder when the piston means is retracted, which movement causes the sealing means to move against and close the opening of the cylinder through which water passes in order to seal the cylinder against entry of air.

---

The present invention relates to a nozzle for a spray pump such as the spray pump associated with an electric iron. More specifically, the present invention relates to certain structural elements which enable the nozzle to avoid dripping when it is not spraying, to be self-cleaning, or to embody both features.

Although the invention has application to spray pumps for other applications, the present invention has particular advantage in use with irons. In such an application it is important that whenever water issues from the nozzle it be in the form of a spray or fine mist and not a drip. One problem in the prior art has been that nozzles, including those which produced a fine spray would tend to drip at the end of a pump cycle as the pressure was reduced. In some cases fabrics which are not damaged by a fine spray are stained by a drip. Another common problem has been the clogging of the nozzle, usually with impurities from the water which is used, particularly if that water is ordinary tap water. Such material tends to accumulate in the orifice of the nozzle just as it tends to close the openings of a steam iron. Even though the orifice may not be completely closed, such material in the orifice may distort or even prevent a proper spray pattern or otherwise cause the nozzle to be less effective than it is designed to be.

A nozzle for a spray pump in accordance with the present invention, does not drip. This is made possible by the use of a special sealing member of resilient deformable material which is deformed by mechanical pressure upon it but is not deformed by the pressures of water or other fluid upon it. This sealing member is located in a chamber defined by walls including a wall having a nozzle orifice in it into which fluid is introduced under pressure. This sealing member acts to seal off the chamber from the orifice by closing passages through the deformable member, along that surface of the deformable member adjacent the wall, or in the wall adjacent the deformable member. To accomplish such sealing off by the sealing member the nozzle is also provided with a plunger extending into the chamber and movable into the sealing member to press it against the wall adjacent the orifice and deform it sufficiently to close the passage or passages from the chamber to the orifice and preferably to deform the sealing member to eliminate all space behind the orifice in which fluid might otherwise be collected. In this manner no water is left in the vicinity of the orifice to drip once the pressure is relieved.

The clogging of the nozzle is prevented by a self-cleaning device which consists of a rigid element of dimensions in the effective region sufficiently small to pass through the orifice. This rigid member is directed toward the orifice and movement of the plunger means on which it is mounted is directed toward the orifice so that movement of the plunger toward the orifice will carry the rigid member through the orifice. Preferably, the cleaning means is combined with the sealing means, in which event the cleaning means is a rigid pin which passes through an opening in the sealing means aligned with the orifice. This opening is sufficiently small to seal against the pin and in preferred embodiments the plunger movement is limited so that the pin is at all times at least partially within the opening.

For a better understanding of the present invention, reference is made to the following drawings in which FIG. 1 is a side elevational view of a spray iron embodying a pump having a nozzle in accordance with the present invention;

FIG. 2 is a greatly enlarged vertical sectional view through the pump and nozzle of the iron in FIG. 1;

FIG. 3 is a partial sectional view similar to FIG. 2 showing the pump in the act of spraying;

FIG. 4 is a partial sectional view even more greatly enlarged, showing the region of the orifice and sealing member as a compressing plunger is advanced;

FIG. 5 is an enlarged sectional view on the scale of FIG. 4 showing the sealing means in position in which it seals off the orifice;

FIG. 6 is a sectional view along line 6—6 of FIG. 3 enlarged to the scale of FIG. 5;

FIG. 7 is a sectional view taken along line 7—7 of FIG. 2 enlarged to the scale FIGS. 4 and 5; and FIG. 8 is a sectional view taken along line 8—8 of FIG. 5.

Referring to FIG. 1, a conventional electric spray iron is shown having a soleplate 10, a handle 12 and intermediate structure enclosed within cover 14 all suitably and conventionally interconnected. The intermediate structure includes steam generating means, including a water reservoir, and appropriate thermostatic control means and related structure which typically may be of constructions similar to those shown in U.S. Patents Nos. 2,880,531 and 2,908,092. The thermostat is controlled by knob 16 to adjust the temperature of the sole-plate of the iron to a desired selected temperature. Surmounting the handle at the forward end of the iron is water pump 18. The water reservoir providing a source of supply of water for the spray pump 18 is located beneath the cover 14 and connected to the pump through handle 12.

The spray pump is seen in some detail in FIG. 2. In many essential respects this pump is similar to the spray pump disclosed in U.S. Patent 3,237,325, and particularly similar to the structure shown in FIG. 11 thereof. The pump housing or cylinder 20 is preferably composed of polypropylene, or other suitable molded resinous material. Housing 20 is supplied water through intake conduit 22, having a suitable check valve 24 to prevent liquid flow back through the supply line to the reservoir instead of spraying. Within the housing 20, and a cylinder provided thereby, is a piston structure 26 which has suitable sealing means 28 to prevent leakage. The piston is connected in turn to a plunger 30 which terminates in the finger piece 32. In FIG. 2 the pressure on finger piece 32 has been released and the piston 26 has been returned by spring 34 to the position shown. Due to the vacuum created by the withdrawal of the piston water has been drawn into the cylinder through line 22 from the reservoir and is ready to be sprayed through the nozzle generally designated 36.

The present invention relates to the construction of the nozzle 36. As can be seen in FIG. 2 this particular nozzle structure is based on a metallic guide member 38 which is pressed into and constitutes the greatest part of the end structure of the housing 20. Guide 38 has a radially extending stop flange 38a and a somewhat smaller flange 38b which acts as a ridge tending to hold it securely within the resinous body of the housing. Guide 38 also has a bore 38c arranged with its axis out of alignment with that of housing 20. It also has a counterbore 38d at the end of the guide inside the housing and a smaller diameter tubular flange 38e extending the guide and its bore at the orifice nozzle end of the guide. The outer diameter of the guide at the orifice end of the housing is threaded in the region 38f between the flange 38a and the nozzle end of the guide. Cooperating with the threaded portion 38f is a cup-shaped nozzle member 40, the inside upper edge 40a of which is threaded to cooperate with the said threaded portion 38f of the guide. Cup 40 is formed with a tubular circumferential rim 40b which retains and positions gasket 42. Gasket 42 is employed to seal the lip of the cup 40 against flange 38a of the guide 38 by compressing the gasket between the opposed planar surfaces.

The amount of compression is limited to that which occurs before the tubular rim 40b contacts the flange 38a as shown. Through the bottom of the cup is orifice 40d, which is axially aligned with bore 38c of the guide and which extends from a shallow dished recess 40e inside the cup to the generally planar bottom outer surface of the cup. When the cup 40 is threaded onto the guide as shown in the drawings a cavity or chamber is defined between them within the cup to the extent that guide 38 does not fill the cup.

In order to perform appropriate sealing functions a sealing member of deformable resilient material is contained within the chamber so defined. As seen in FIGS. 2, 3 and 6 the undistorted cross-sectional shape of the sealing member 44 generally conforms to the shape of the bore, and here is cylindrical, with a radially extending circumferential flange at the end which is most closely adjacent the orifice 40d. The axial position of the sealing member 44 is maintained by providing that a portion of its small diameter generally cylindrical portion is at all times engaged within tubular flange 38e which provides a cylindrical bore. As seen in FIG. 7 the cylindrical form is modified by flattening to chords certain arcuate segments of the cylinder to provide flow channels past the sealing member from the bore into the chamber. Flow from the chamber to the orifice occurs through a pair of stub channels 44a which, as seen in FIG. 6, are formed in the flange face of the sealing member. During fluid flow the sealing member is carried by the initial flow into contact with the bottom of the cup 40 which completes the walls of the passages. The stub channels are arranged generally parallel to one another and extend from the outer edge of the flange inwardly tangentially to the periphery of the dished recess 40e. When the sealing member is in the position shown in FIG. 3, i.e., undistorted but flat against the bottom of the cup, these channels together with the bottom of cup 40 provide passages for the flow of water and by their arrangement, provide a swirling action within the recess 40e to produce a rotation of the water particles which are emitted as a spray through the orifice 40d in the same general maner in which that effect is produced in the structure of U.S. Patent 3,237,325.

In the spraying action as the finger piece 32 is pressed forward moving the plunger 30 in that direction against the action of spring 34. The pressure produced by piston 26 forces water through the bore of the guide 38, past the sealing member 44, into the chamber between the guide and the cap, through the channels 44a into the recess 38e and hence into the orifice 40d.

In order to abruptly stop flow at the end of each pumping stroke, a plunger 46 is provided which brings mechanical pressure to bear against the sealing member 44. The sealing member 44 is distorted by this mechanical pressure, as shown in FIG. 4. Upon the attainment of the position shown in FIG. 4, the pressure collapses the channels 44a to seal off the orifice, as shown in FIG. 5. Because of its deformable resilient nature, the sealing member is able to be compressed against the bottom wall of the cup 40 by the plunger until the passages to the orifice are closed (in this case, until the passages 44a are squeezed down flat against the bottom of the cup). The sealing member continues to be distorted by the plunger until it fills the recess 40e as seen in FIG. 5. In this condition of the sealing member no space is left in which water can collect to pass through orifice 40d as drips instead of spray and a good seal is provided against flow from the chamber within the cup of the orifice. It will be apparent to those skilled in the art that the one or more passages through or past the sealing member could alternatively be holes through the resilient deformable material instead of channels. Another possible form of such passages is channels formed in the bottom of the cup adjacent the sealing member whose deformable resilient material is deformable into those channels to close them off under pressure from the plunger.

The plunger is preferably designed to fit within and be guided by the bore in the guide 38 so that it is aligned with the sealing member and the orifice. The plunger must be designed to permit the passage of water through the bore past the plunger. This may be accomplished in a variety of ways, a preferred way being shown in the sectional drawing of FIG. 8. This preferred arrangement provides the bore with radially inwardly, longitudinally extending ribs or splines 38g whose inner edges conform to the cross-section shape of the plunger and provide bearing surfaces to direct movement of the plunger. These ribs 38g as shown by the phantom lines in FIG. 5 terminate in the bore just above the tubular flange 38e, and the remaining part of the bore as seen in FIG. 7 is circular in cross-section. Abrupt termination of the ribs 38g provides a plurality of shoulders which serve as a stop against which the opposed shoulder of an enlarged diameter portion 46a of the plunger 46 abuts to limit movement of the plunger away from the sealing member and the orifice under the urging of spring 50. A stop limiting the movement of the plunger away from the orifice can alternatively be provided in other ways.

Spring 50 is attached to the opposite end of the plunger means 46 from the enlarged diameter portions 46a. The plunger is provided with a flanged end 46b. The side of the flanged end away from the plunger is rounded for contact with the piston 26 whereas the side adjacent the plunger provides a shoulder against which the small end of the conically wound helical spring 50 terminates. The broader end of the spring 50 terminates in the recess 38d at the end of the guide within housing 20. Conical spring 50 is a compression spring which urges the plunger away from orifice 40d and enlarged diameter portion 46a against the stop shoulders provided by the ends of ribs 38g. Thus, the rest position of the plunger is that shown in FIGS. 2 and 3 and the forward facing surface of enlarged diameter portion 46a of plunger 46 remains in this position out of contact with the sealing member at all times until the piston 26 moves into contact with the sealing member near the forward end of its stroke.

The plunger also carries fixed to the end nearer the orifice 40d a rigid pin 52 axially aligned with the orifice and movable with the plunger toward the orifice and through the orifice 40d as shown in FIG. 5. A small hole 44b through sealing member 44, is axially aligned with the orifice 4d and the pin 52. The axial hole 44b in the sealing member must be sufficiently small that it maintains a water tight sealing relationship with the pin while permitting axial relative movement. Preferably the total movement of the pin as determined by the plunger stop and the length of the sealing member 44 is such that the pin is never completely removed from the hole 44b as the plunger moves back and forth.

The plunger is driven toward the orifice as the piston nears the end of its stroke and presses against the end 44b. As the piston moves the plunger toward the orifice it compreses the spring 50. In the course of this movement the sealing member 44 is compressed as previously described and illustrated in FIGS. 4 and 5, due to the pressure of the plunger on sealing member 44. As the sealing member is distorted the pin 52 moves toward the orifice 40d as seen in FIG. 4 and as compression of sealing member 44 is completed the pin 52 moves through the orifice, as seen in FIG. 5. In the latter position pin 52 acts to clean any foreign material out of the orifice.

As pressure is released from the finger piece 32 the piston 26 is urged by spring 34 back into the position of FIG. 2. As the piston moves back it is followed by the plunger 46 under the urging of spring 50. As the plunger 46 moves back into the position of FIG. 2 the sealing member tends to be carried with it. Ultimately the radially extending circumferential flange of the sealing member engages the end of tubular flange 38e thus sealing the bore of the guide from the chamber defined by the interior of the cup 40 and from the orifice 40d. This enables creation of a vacuum as piston 26 moves back to draw water through check valve 24 into the housing as the piston returns to the position of FIG. 2.

Thereafter whenever spraying is desired the cycle is reepated beginning with pressure being applied to finger piece 32.

It will be clear to those skilled in the art that the plunger means could be actuated manually or otherwise, but that the location of the plunger in position to be actuated by the piston at almost the end of its stroke is highly advantageous. The much shorter stroke of the plunger makes this combination possible. The plunger can also be of many other forms and does not necessarily have to be located in the bore of a spool-like member in another embodiment. However, a plunger or equivalent mechanical element to compress the sealing means is required in order that the greater pressure than water pressure necessary to compress the sealing member be mechanically applied.

Although the structure described has been shown with both the sealing member and the orifice cleaning means it is apparent that these features may be used separately as well as in combination. However, their combination provides a distinct advantage and particularly in the embodiments shown, the cleaning means serves to insure proper positioning of the sealing member.

I claim:

1. A nozzle for a spray pump for spraying fluids comprising:
   walls defining a chamber into which fluid is introduced under pressure including a wall having a nozzle orifice therein,
   a sealing member of deformable resilient material capable of withstanding fluid pressures employed without materially deforming within the chamber cooperating with said wall having a nozzle orifice to provide a seal between the orifice and the chamber and providing at least in part at least one passage between the chamber and the orifice for the direction of fluid from the chamber to the orifice,
   a plunger extending into the chamber and movable into contact with the sealing member to distort the sealing member sufficiently to close said at least one passage.

2. The nozzle of claim 1 in which the plunger carries a rigid pin of dimensions sufficiently small to pass through said orifice and directed toward said orifice so that movement of the plunger will carry it through the orifice and the sealing means is provided with a hole through which the rigid pin passes in moving toward said orifice.

3. The nozzle of claim 2 in which the plunger is housed and supported within a guide through a wall of the chamber, which guide is located opposite the orifice and the sidewalls of the guide are arranged to support and guide the plunger and the sealing member is arranged to over-lap walls defining and bounding the orifice and to be movable from the position against the wall containing the orifice to a position against the wall bounding the guide in which latter position the sealing member acts as a seal against the flow of air into the guide upon the return stroke of the piston of the spray pump.

4. The nozzle of claim 3 in which the sealing means is of a cross-sectional shape generally corresponding to that of the guide, smaller than the guide, and extending into the guide in all positions to serve to guide and position the sealing member and having a radially extending circumferential flange which provides the portion to over-lie and seal against the walls defining the guide.

5. The nozzle of claim 2 in which at least one passage is defined by a channel in the face of the sealing means which contacts the wall adjacent the orifice so that the at least one passage is defined by the groove in combination with the wall adjacent said orifice.

6. The nozzle of claim 4 in which a plunger is designed to fit within the guide to be slideably in contact with the sidewalls of the guide for stable direction of the plunger but with the combination of the guide and plunger being such that channels are provided whereby fluid may flow past the plunger into the chamber.

7. The nozzle of claim 4 in which the plunger and bore are provided with cooperating stop means to determine and limit its maximum movement of the plunger away from the orifice and spring means between the guide and the plunger to urge the plunger against said stop means.

8. The nozzle of claim 7 in which the spring means provided is of helical conical shape its narrow end engaging a shoulder on the plunger and its broad end engaging the guide.

9. The nozzle of claim 4 in which the length of the portion of the sealing member conforming generally in cross-section to the guide is such that when the sealing member is against the walls surrounding the orifice and the plunger is in its fully retracted position, the pin remains in sealing engagement with the hole through the sealing member and a portion of the sealing member remains within the guide.

10. A spray pump for spraying fluids having a self-cleaning nozzle comprising:
    a pump cylinder,
    nozzle means in communication with the pump cylinder having a nozzle orifice,
    valve means at the spray end of the cylinder for supplying fluid from a reservoir to fill the cylinder,
    piston means within the cylinder,
    means extending into the cylinder to urge the piston toward the nozzle means to force fluid in the cylinder out through the nozzle orifice and to allow the piston to be moved away from the valve to draw water into the cylinder and
    a sealing member associated with the nozzle means which permits the escape of the fluid until compressed by the piston means against the nozzle means surrounding the orifice but moves away from the orifice and against the cylinder to seal the cylinder against entry of air as the water is drawn into it.

11. A spray iron having a soleplate, a water reservoir positioned above the soleplate, handle fixed relative to the soleplate, and spray means mounted above the forward end of said handle, said spray means comprising a spray nozzle, a cylinder having a water inlet communicating with said reservoir and a duct providing communication between the cylinder and the spray nozzle, a piston within the cylinder actuatable by thumb pressure along an axis generally in line with the spray nozzle, said nozzle, including walls defining a chamber into which fluid is introduced under pressure from the cylinder through the duct, including a wall opposite said inlet duct, having a nozzle orifice therein, a sealing member of deformable resilient material capable of withstanding fluid pressures employed without materially deforming within the chamber cooperating with said wall having a nozzle orifice to provide a seal between the orifice and the chamber and providing at least in part at least one passage between the chamber and the orifice for the direction of the fluid from the chamber to the orifice, a plunger in said duct movable toward said chamber and into contact with the sealing member to distort the sealing member sufficiently to close said at least one passage directed toward said orifice and carrying a pin of dimensions sufficiently small to pass through said orifice so that movement of the plunger means toward the orifice will carry it through the orifice, said pin extending at all times into an axial hole through the sealing member and being in sealing engagement with the sealing member.

12. The spray iron of claim 11 in which the plunger extends into the cylinder of the spray pump and is normally urged away from the orifice by spring means urging it against a limiting stop so that the plunger is in position to be contacted by the piston within the cylinder toward the end of its stroke and moved by the piston toward the orifice.

13. The spray iron of claim 12 in which the duct to the nozzle is a combination of parts molded into the cylinder structure of the pump, the duct being a bore through a guide element and the guide element in turn cooperating with a cup through whose bottom is provided an orifice opposite the duct bore.

14. The spray iron of claim 13 in which the plunger is designed to be slidably supported in the duct and the guide element in combination with the plunger being provided with passages or channels through which fluid may bypass the plunger.

15. In a reciprocating spray pump for spraying fluid having an intake stroke for drawing fluid into a pump chamber and an exhaust stroke for pumping it through a spray orifice the improvement comprising a reciprocating element which moves toward the spray orifice to pump fluid through the spray orifice a member on said reciprocating element shaped to pass through said spray orifice for removal of material lodged therein, resilient means for biasing said member to a first position in which it is held out of said orifice but axially in line with said orifice and mechanical means for forcing said member through said orifice in opposition to said bias near the completion of each exhaust stroke.

16. The reciprocating spray pump of claim 15 in which the member shaped to pass through the orifice is a pin-like extension of a plunger on which said resilient means acts and the end of which is positioned to be contacted by said reciprocating element.

References Cited

UNITED STATES PATENTS

| | | | |
|---|---|---|---|
| 1,837,861 | 12/1931 | Green et al. | 239—117 |
| 2,733,959 | 2/1956 | Dickison et al. | 239—117 |
| 3,025,005 | 3/1962 | Dafforn et al. | 239—117 |
| 3,237,325 | 3/1966 | Wagner et al. | 38—78 |

PATRICK D. LAWSON, Primary Examiner

U.S. Cl. X.R.

239—117